Patented May 3, 1938

2,116,016

UNITED STATES PATENT OFFICE 2,116,016

GLYOXAL-SEMI-ACETALS

Hermann Fischer, Basel, Switzerland

No Drawing. Application February 26, 1936, Serial No. 65,925. In Switzerland March 2, 1935

2 Claims. (Cl. 260—141)

Glyoxal-semi-acetal has not hitherto been produced in a pure form. Harries does, indeed, describe the production of glyoxaldiethyl-acetal (semi-acetal) by ozonizing acrolein-acetal and subjecting the ozonite to the action of boiling water. He obtained a product which cannot be distilled without decomposition, but in which he could detect glyoxal by means of phenyl-hydrazine-acetate (Berichte, vol. 36, page 1935, 1903). Later, Wohl and Mylo stated that the valuable semi-acetal could not be obtained by the prescription of Harries and that their own researches to produce it in another manner were not successful (Berichte, vol. 45, page 324, 1912).

The present invention relates to a process for making glyoxal-semi-acetals in a pure form by oxidizing a compound containing the grouping

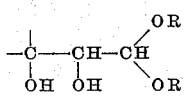

in which R is a hydrocarbon residue, preferably alkyl or aralkyl, with an oxidizing agent of the kind proposed for splitting α-glycols, particularly an organic lead tetra-salt, for instance lead-tetra-acetate. In this manner the known molecular scission occurs between the two carbon atoms which carry the hydroxyl-groups, so that there is obtained on the one hand the desired glyoxal-semi-acetal and on the other hand, according to the nature of the groups still attached to the other hydroxylated carbon atom, an aldehyde or a ketone.

Thus, glycerol-aldehyde-acetal yields on oxidation with lead-tetraacetate on the one hand glyoxal-semi-acetal of the formula

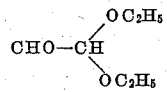

and on the other hand formaldehyde.

It could not be foreseen that a glyoxal-semi-acetal, which had to be regarded as extremely sensitive, could be isolated from the mixture produced by the reaction, since oxidation with lead-tetra-salts liberates acid. Thus, in the oxidation of glycerol-aldehyde-acetal with lead tetraacetate, 2 molecules of acetic acid per molecule of glyoxal-semi-acetal produced are liberated.

The new compounds are valuable parent materials for syntheses of all kinds.

The following examples illustrate the invention, the parts being by weight:—

Example 1

65 parts of glycerol-aldehyde-diethylacetal are mixed in benzene solution with 177 parts of lead-tetraacetate. After about 2 hours the separated lead salt is filtered and the benzene distilled, whereby formaldehyde and acetic acid are for the greater part also distilled. The residue is dissolved in ether and the ethereal solution shaken with the smallest possible amount of potassium carbonate solution until no further carbon dioxide is evolved. The ethereal solution is then dried with sodium sulfate, the ether evaporated and the residue distilled in a vacuum. After a second distillation the glyoxal-semi-diethylacetal is obtained in the form suitable for analysis. It is a liquid as clear as water and boiling at 43–44° C. under 11 mm. pressure.

From the respective glycerol-aldehyde-acetals may be produced in the same manner the glyoxal-semi-dimethyl-, dipropyl-, diisobutyl-, dibenzyl-, etc. acetals. They form clear liquids like the diethylacetal.

Instead of lead-tetraacetate there may also be used other organic lead tetra-salts, for instance the tetrapropionate.

Example 2

Instead of the glycerol-aldehyde-diethylacetal used in Example 1, 89 parts of dihydroxy-succinic-dialdehyde-tetraethylacetal are substituted. There is produced by the oxidation of 1 mol. of the tetraethylacetal, a nearly theoretical yield of 2 mols glyoxal-semi-acetal, which can be isolated by distillation in the manner described in Example 1. The use of the dihydroxy-succinic-dialdehyde-tetraethylacetal has the advantage that only glyoxal-semiacetal is produced, there being no by-products.

In the same manner other acetals of the dihydroxy-succinic-dialdehyde may be used as starting material.

What I claim is:—

1. As new chemical products, the isolated pure glyoxal-semi-acetals.

2. As a new chemical product, isolated pure glyoxal-semi-diethylacetal.

HERMANN FISCHER.